(12) United States Patent
Invernizzi et al.

(10) Patent No.: US 9,621,412 B2
(45) Date of Patent: Apr. 11, 2017

(54) METHOD FOR GUARANTEEING SERVICE CONTINUITY IN A TELECOMMUNICATION NETWORK AND SYSTEM THEREOF

(71) Applicant: TELECOM ITALIA S.p.A., Milan (IT)

(72) Inventors: Fabrizio Invernizzi, Turin (IT); Mario Ullio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 111 days.

(21) Appl. No.: 14/652,669

(22) PCT Filed: Dec. 27, 2012

(86) PCT No.: PCT/EP2012/005384
§ 371 (c)(1),
(2) Date: Jun. 16, 2015

(87) PCT Pub. No.: WO2014/101926
PCT Pub. Date: Jul. 3, 2014

(65) Prior Publication Data
US 2015/0341205 A1   Nov. 26, 2015

(51) Int. Cl.
| | | |
|---|---|---|
| H04L 12/24 | (2006.01) | |
| H04W 36/12 | (2009.01) | |
| H04L 12/703 | (2013.01) | |
| H04L 29/14 | (2006.01) | |
| G06F 11/14 | (2006.01) | |
| H04L 29/08 | (2006.01) | |
| H04L 12/26 | (2006.01) | |
| G06F 11/20 | (2006.01) | |

(52) U.S. Cl.
CPC ...... *H04L 41/0668* (2013.01); *G06F 11/1443* (2013.01); *H04L 45/28* (2013.01);
(Continued)

(58) Field of Classification Search
CPC ... H04L 12/24; H04L 12/703; H04L 67/1029; H04L 45/28; H04L 67/2819;
(Continued)

(56) References Cited

U.S. PATENT DOCUMENTS

| | | | |
|---|---|---|---|
| 2004/0172528 A1* | 9/2004 | Tenereillo | H04L 63/0428 713/153 |
| 2006/0019834 A1 | 1/2006 | Melbouci et al. | |

(Continued)

FOREIGN PATENT DOCUMENTS

| | | |
|---|---|---|
| EP | 1 703 693 | 9/2006 |
| EP | 1 863 258 | 12/2007 |

OTHER PUBLICATIONS

International Search Report Issued Sep. 4, 2013 in PCT/EP2012/005384 Filed Dec. 27, 2012.

*Primary Examiner* — Ian N Moore
*Assistant Examiner* — Lakeram Jangbahadur
(74) *Attorney, Agent, or Firm* — Oblon, McClelland, Maier & Neustadt, L.L.P.

(57) ABSTRACT

A method providing service continuity of a telecommunication network, wherein a first node of the network receives a service request sent by a client computer to a first service server providing the service, the first service server accessing the network by the first node, the method including: storing a local copy of data packets related to the received service request; starting a server state verification procedure to check an operative state of the first service server; and transmitting the data packets to a second service server if the server state verification procedure detects a failure in the operative state of the first service server, the second service server being configured to act as a backup server for the service to be provided.

8 Claims, 6 Drawing Sheets

(52) U.S. Cl.
CPC ........ *H04L 67/1034* (2013.01); *H04L 67/288* (2013.01); *H04L 67/2814* (2013.01); *H04L 67/2819* (2013.01); *H04L 67/2876* (2013.01); *H04L 69/40* (2013.01); *H04W 36/12* (2013.01); *G06F 11/2038* (2013.01); *G06F 11/2048* (2013.01); *H04L 43/0817* (2013.01); *H04L 67/1029* (2013.01); *H04L 67/2842* (2013.01)

(58) Field of Classification Search
CPC . H04L 67/1034; H04L 67/2842; H04L 69/40; H04W 36/12
See application file for complete search history.

(56) References Cited

U.S. PATENT DOCUMENTS

| | | | |
|---|---|---|---|
| 2006/0190602 A1* | 8/2006 | Canali | H04L 29/06 709/226 |
| 2007/0214196 A1 | 9/2007 | Garimella et al. | |
| 2007/0300240 A1* | 12/2007 | Viegener | H04L 67/02 719/320 |
| 2008/0114827 A1 | 5/2008 | Gerber et al. | |
| 2012/0307629 A1* | 12/2012 | Vasseur | H04L 45/34 370/228 |

* cited by examiner

METHOD FOR GUARANTEEING SERVICE CONTINUITY IN A TELECOMMUNICATION NETWORK AND SYSTEM THEREOF

TECHNICAL FIELD

The present invention relates to the field of telecommunication networks, and in particular to a method and a system for guaranteeing service continuity in a telecommunication network. The present invention also relates to devices suitable for providing the above method.

BACKGROUND ART

In telecommunication networks, it is necessary to guarantee service to users even in case of failure of network's equipments.

This problem is particularly perceived in geographically distributed networks wherein the great physical distance between network equipments makes a technical failure more probable.

If a user requests some services to a network server which is no more available (for instance because of server breakdown or connection problems) the network needs to replace this server with another operating one, called backup server.

Typically, known distributed backup solutions make use of a primary server and a backup server connected to each other by means of a telecommunication network.

Clients query the primary server in order to receive a service; in case of failure of the primary server, a backup algorithm redirects traffic on the backup server.

A typical example of these backup solutions is provided for databases, like MySQL (MySQL Cluster NDB 7.2, http://dev.mysql.com/doc/refman/5.5/en/mysql-cluster.html), wherein, in order to increase service availability and to reduce failure recovery time, a plurality of geographically distributed servers is used. One server acts as a master directly receiving the queries from the clients. By using proprietary algorithms and protocols, a copy of the queries and of the database changes is provided to other backup servers via a TCP/IP network; these backup servers are therefore kept in a state which is coherent with the current state of the master server. In case of failure of the master server, new queries are redirected to one of the backup servers which wakes-up and replies to the new queries, therefore providing service continuity to the clients.

US patent application US 2008/0114827 A1 discloses a backup solution for a distributed server system which comprises a primary manager, one or more backup servers and one or more work servers. The primary manager distributes service requests to the backup servers, which, in turn, deliver them to the work servers that execute the requested service. Primary manager associates a state identifier to each service request, so that all backup servers store a corresponding state of the primary manager. In case of failure of the primary manager each backup server can replace the primary manager. Backup servers aggregate replies outputted by the work servers and send these replies to the primary manager.

Once each backup server has completed the operation associated with a command of the primary manager, it sends a success or failure message to the primary manager. If one of the backup servers or one of the workers is not responding, the primary manager may generate a new service request to assign the work of the not responding backup server or work server to other backup servers or work servers.

US patent application US 2006/019834 describes an apparatus and a method for improving intercell handover of a wireless network, i.e. the process of transferring an ongoing call or data session from one access point to another one. Access points and mobile terminals are provided with a communication interface with an intermediate OSI layer having a buffering function, called Intermediate Buffer Management Layer, IBML. This intermediate layer is below the third OSI layer and maintains a copy of data packets transmitted through the lower layers. When the access point in use detects a forthcoming handover, the content of its own buffering layer is transferred to the buffering layer of the next access point which the mobile terminal is connecting to.

US 2007/0214196 A1 discloses systems and methods for providing a federated backup involving coordination and synchronization of backup and restore operations among a plurality of hosts to ensure data consistency. A master node (backup host) acts as a controller for the entire backup and restore operation. All other application hosts of the network execute backup and restore operation according to the master node inputs. All hosts are connected via Ethernet links.

OBJECTS AND SUMMARY OF THE INVENTION

Concerning US patent application US2008/0114827 A1, in order to be sufficiently safe, this system requires that a plurality of backup servers executes in parallel a backup of the primary server. As a consequence, the system utilizes network resources and servers in an inefficient way.

In the system described by US2006/019834 the failure is identified by the access point but the detection could not be possible in case the access point is totally not operative, e.g. because of a major breakdown. Similarly, a major failure could prevent the transmission of the buffering layer contents between two access points.

Further, the solution proposed by US2007/0214196A1 does not provide for a mechanism which guarantees continuity in the operation of an application in case of network failure: data are kept coherent, but it is necessary to get back to a stored state of the application; data and information exchanged in the time interval between saving of the application state and failure of the network service are lost.

As a consequence, there's a need for a backup system which is reliable and does not require a huge amount of network resources for its operation.

It is an object of the present invention to present a method for guaranteeing network services which is alternative to the prior art.

It is also an object of the present invention to provide a method for guaranteeing network services that is reliable.

It is another object of the present invention to provide a method for guaranteeing network services that is more efficient than the ones of the prior art.

According to the invention these and other objects are achieved by means of a method comprising the features of the annexed claims, which form integral part of the present description.

The invention also relates to a backup system adapted to implement this method.

According to one aspect of the invention, a client sends data packets to a first server of the network, called master service server. A first node of the network, called master node, maintains a local copy of the data packets sent to the master service server and verifies the operative state of the master service server. If the first node detects that the master service server is not operative, the first node sends the data packets to a second server of the network, called slave service server, which provides the same services of the master service server. Even if a serious failure occurs in the master service server, the data packets are not lost but they are received by another server, the slave one, that may deliver services requested by the client.

In a preferred embodiment, the slave service server accesses the network by means of a second node, called slave node, that stores the data packets sent to the master service server and transmits them to the slave service server when the master node detects that the master service server is not operative.

This choice is advantageous since it reduces the recovery time of the network, i.e. the time needed by the network to re-establish the service after a server failure.

Advantageously, the master node verifies the operative state of the master service server by sending master service server verification messages and comparing the replies with expected messages.

This choice allows checking the server state in a simple and efficient way.

The invention also relates to an evolved network node (the master and the slave nodes) that in a preferred embodiment comprises:

a receiving unit adapted to receive a service request sent by a client computer to a first service server (master service server) providing said service, said first service server accessing the network by means of said evolved network node;

a buffering unit adapted to store a local copy of data packets related to said received service request;

a verification unit adapted to start a server state verification procedure in order to check the operative state of said first service server; and a transmitting unit adapted to transmit said data packets to a second service server (slave service server) if said server state verification procedure detects a failure in the operative state of said first service server, said second service server being configured to act as a backup server for said service to be provided.

Further objects and advantages of the present invention will be clear from the following description of preferred embodiments disclosed as non limitative examples of the invention.

BRIEF DESCRIPTION OF THE DRAWINGS

The invention will be presented here below with reference to non limiting' examples, provided for explicative and non limitative reasons in the annexed drawings. These drawings illustrate different aspects and embodiments of the present invention and, where appropriate, reference numerals illustrating how structures, components, materials and/or elements in different figures are indicated by similar reference numbers.

DETAILED DESCRIPTION OF THE INVENTION

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the scope of the invention as defined in the description and claims.

In the following description the use of "e.g.," "etc," and "or" indicates non-exclusive alternatives without limitation unless otherwise noted. The use of "including" means "including, but not limited to," unless otherwise noted. Similarly, "comprising" means "comprising, but not limited to,".

Figure 1:
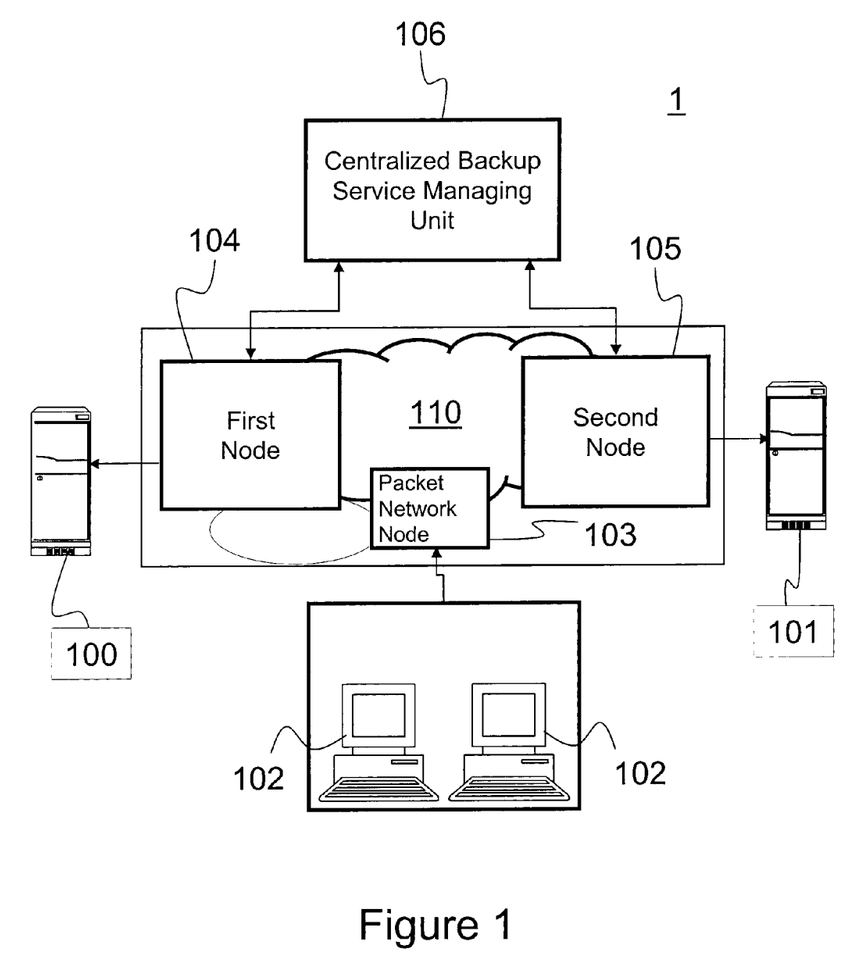
FIG. 1 illustrates a backup system that implements the method of the present invention.

FIG. 1 schematically shows a backup system 1 according to the present invention wherein a Master Service Server 100 and a Slave Service Server 101 provide services to one or more client computers 102 through a packet-switched network 110 preferably based on a TCP/IP protocol.

A client computer 102 can for example execute a distributed application that requires the Master Service Server 100 to provide services, like retrieval of data in a database, visualization of selected web pages or downloading of new e-mails.

A client computer 102, e.g. a personal computer with suitable network connection modules (like a modem, or an Ethernet card or a gateway), therefore accesses the packet-switched network 110 in order to request the Master Service Server 100 some services.

Specifically, each client computer 102 connects to a packet network node 103 (in particular an IP router), which routes data packets received from the client computer 102 to a first evolved network node 104 (designated as master node in the following) which provides network access to the Master Service Server 100. Slave Service Server 101 operates as a backup server of the Master Service Server 100 and accesses the packet-switched network 110 via a second evolved network node 105 (designated as slave node in the following).

Slave Service Server 101 is configured to provide each client computer 102 with the same services as those provided by the Master Service Server 100. For this reason both the Master Service Server 100 and the Slave Service Server 101 comprise memory areas (like hard disks, mass memories, DRAM, etc. . . . ) storing identical computer programs which, when run by means of a respective processor, implement the same services requested by the client.

The backup service according to the present invention is implemented by means of the evolved network nodes 104 and 105 which are configured by means of a centralized backup service management unit 106, that in its turn, is configured by means of a configuration file or directly by an operator. According to the present invention, the centralized backup service management unit 106 assigns and holds a backup identifier to each user service subscription agreement associated to a service for which service continuity should be guaranteed.

In one embodiment, the backup service is implemented according to a basic backup mode hereby described with reference to FIG. 2.

Specifically, at step 200, master node 104 receives data packets sent by one client computer 102 to the Master Service Server 100, said data packets being related to a service request that should be checked.

Upon reception of the data packets, master node 104 stores (step 201) a local copy of the received data packets and according to the present invention it starts (step 202) a server state verification procedure to check the operative state of the Master Service Server 100. In one embodiment, checking can be completed for each service request that has to be delivered to the Master Service Server 100, but the present invention is not limited to this case. In an alternative embodiment, master node 104 can periodically start the server state verification procedure to check the operative state of the Master Service Server 100.

Based on the results provided by the server state verification procedure, at a step 203, the master node 104 takes a decision whether the Master Service Server 100 is working properly or not. If the decision is positive, master node 104 delivers the stored data packets to the Master Service Server 100 (step 204). If the decision is negative, master node 104 transmits the stored data packets to the slave node (105) (step 205) that stores a local copy of the data packets received by the master node (104) (step 207) and then transmits them to the Slave Service Server 101 (step 206).

Figure 3:
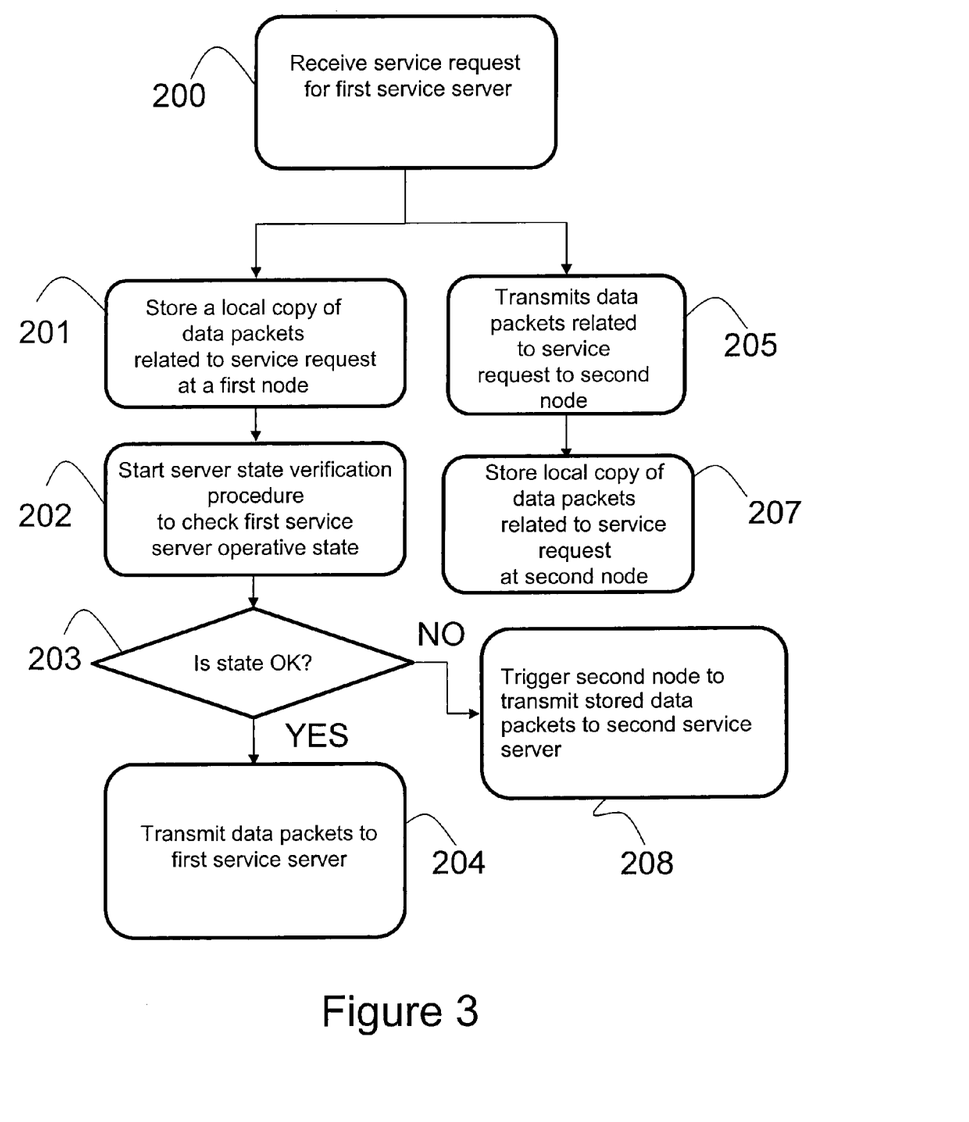
FIG. 3 is a flow diagram of the method according to a second embodiment of the present invention.

In an alternative embodiment, the backup service is implemented according to a so called hot standby backup mode hereby described with reference to FIG. 3.

Figure 2:
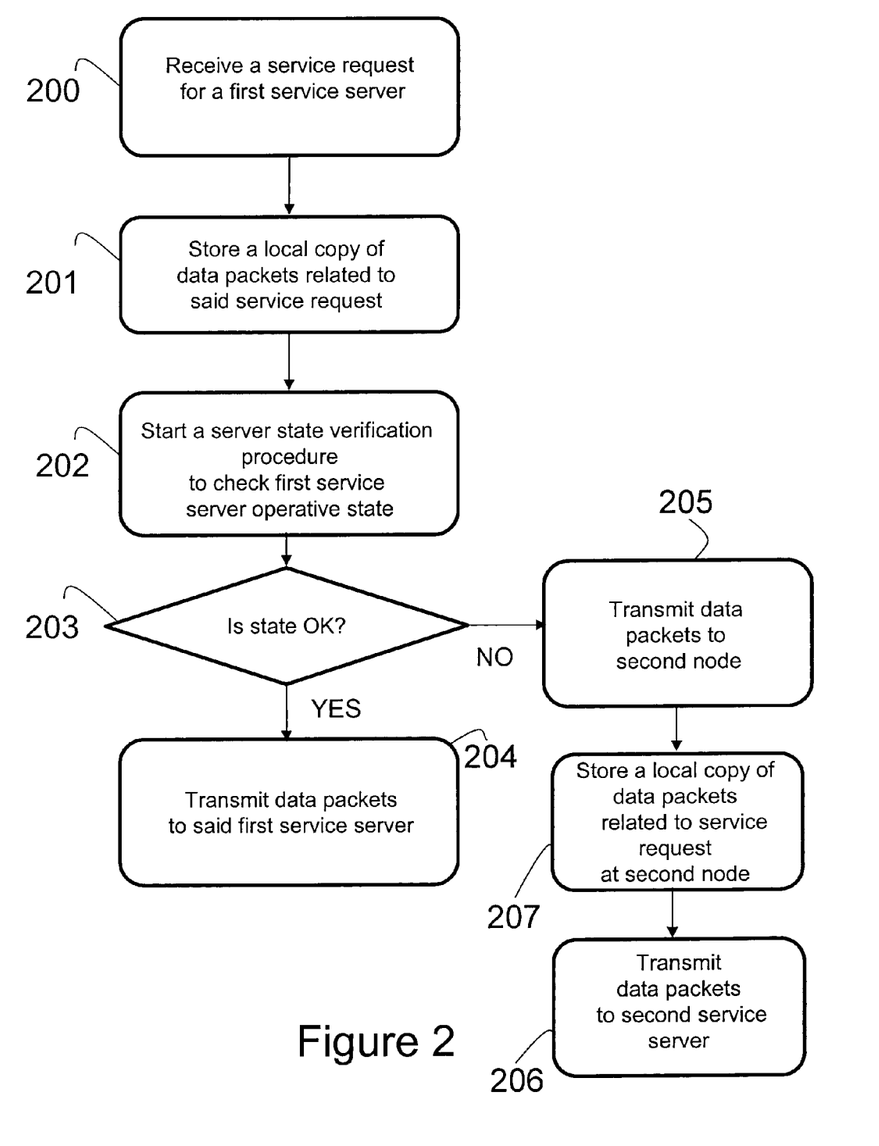
FIG. 2 is a flow diagram of the method according to a first embodiment of the present invention.

This embodiment differs from the one of FIG. 2 in that data packets received by the master node 104 are promptly transmitted (step 205) to the slave node 105 that stores a local copy of them (step 207). In this way a copy of the data packets intended for the Master Service Server 100 is also stored in the slave node 105 so as to make it immediately available to the Slave Service Server 101 if a failure of the Master Service Server 100 is detected by the master node 104. Specifically, if the server state verification procedure detects at step 203 that Master Service Server 100 is not working properly, master node 104 transmits a trigger signal to the slave node (105) in order to start the transmission of the stored data packets to the Slave Service Server (101) (step 208 of FIG. 3).

Evolved Network Node

Figure 4:
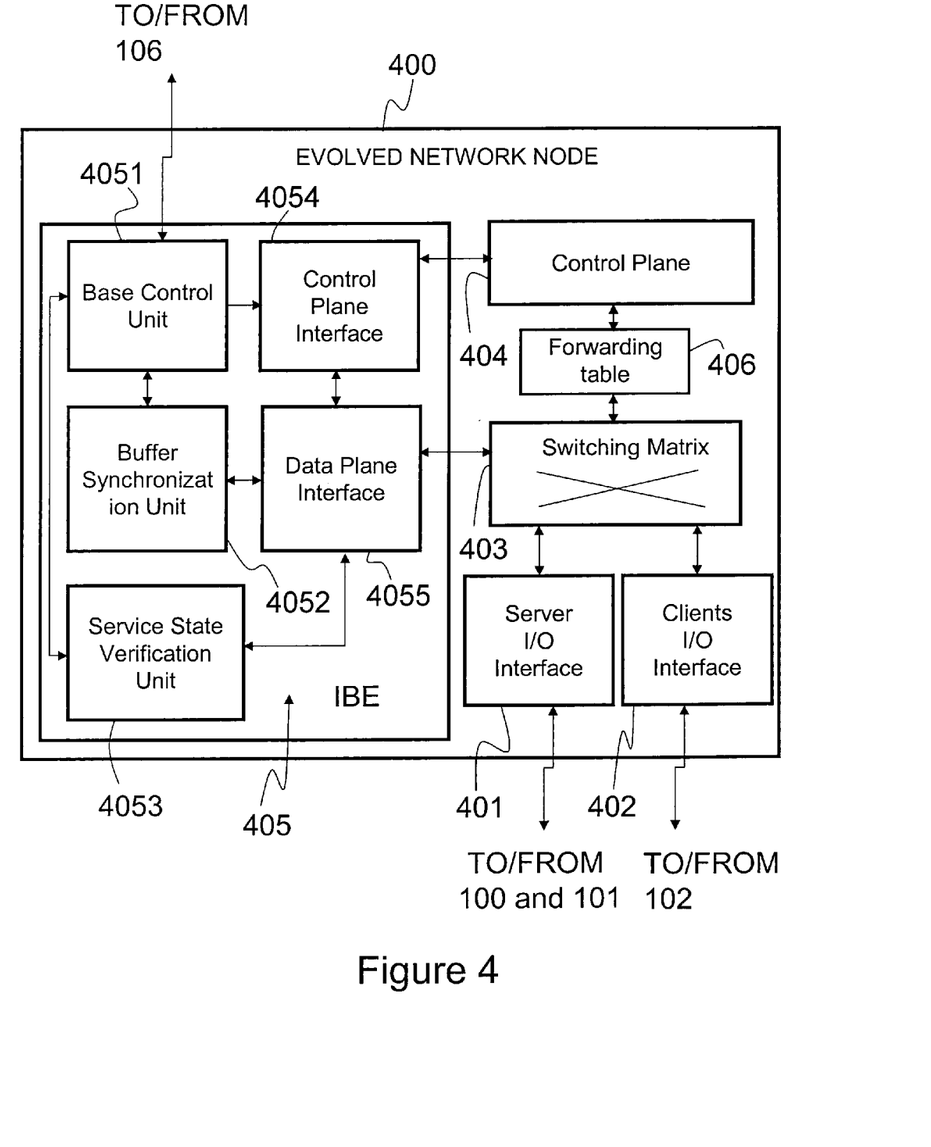
FIG. 4 illustrates an evolved network node according to the present invention.

A detailed description of an evolved network node that is suitable to act as master node or slave node according to the present invention is hereby made with reference to FIG. 4.

Specifically, the evolved network node 400 of FIG. 4 comprises Input/Output interfaces (I/O interface) 401 and 402, a Switching Matrix 403, a Control Plane 404, a Forwarding Table 406 and an Intelligent Buffering Element (IBE) 405.

The I/O interfaces 401 and 402 are directly connected to the network 110. In particular, client I/O interfaces 402 are used to transmit and receive data packets to and from client computers 102, while server I/O interfaces 401 are used to transmit and receive data packets to and from external servers (Master Service Server 100 and Slave Service Server 101).

Switching matrix 403 switches data packets between I/O interfaces; in particular data packets received from a client computer 102 via a client I/O interface 402 are transmitted to a server (Master or Slave Service Server) via a server I/O interface 401 while data packets received from a server (Master or Slave Service Server) via a server I/O interface 401 are transmitted to a client computer 102 via a client I/O interface 402. Switching of data packets between I/O interfaces is implemented according to rules stored in the forwarding table 406 and defined by the Control Plane 404, which is configured for calculating packet routing rules using dynamic routing protocols, such as OSPF, BGP, IS-IS, or statically defined rules. According to the present invention, the Control Plane 404 is also configured to modify the rules stored in the forwarding table 406 in order to identify which service requests among the service requests received from the client I/O interface 402 should be routed to the IBE 405 by means of the switching matrix 403 before being sent to the Master Server Service 100. According to the present invention, IBE 405 maintains a local copy of the data packets related to the routed service requests.

As better explained below, IBE 405 is also configured for monitoring the correct working of the server which is connected to the evolved network node 400 (for example the Master Service Server 100 if the evolved network node 400 corresponds to the master node 104).

Again with reference to FIG. 4, IBE 405 comprises a Base Control Unit (BCU) 4051, a Buffer Synchronization Unit (BSU) 4052, a Service State Verification Unit (SSVU) 4053, a Control Plane Interface (CPI) 4054 and a Data Plane Interface (DPI) 4055.

In detail, BCU 4051 manages information sent by the centralized backup service management unit 106 and related to the services for which the backup service according to the present invention should be enabled or disabled. This information may comprise information relative to the type of service requests to be checked or removed, the mode of operation of the evolved network node (basic backup mode or hot-standby backup mode) and information relative to the Service Server on which the delivering of the considered service is currently active.

Further, BCU 4051 manages the communications with the remote evolved network nodes.

In particular, for each information received by the centralized backup service management unit 106, the BCU addresses:

BSU 4052 to initialize a data packet buffering process;

SSVU 4053 to check the operative state of the server connected to the evolved network node 400 (e.g. in the embodiment of FIG. 1 the SSVU included in the master node 104 checks the operative state of the Master Service Server 100).

CPI 4054 to manage correct routing of data packets by communicating and exchanging information with the Control Plane 404 so as to opportunely modify the routing rules stored in the Forwarding Table 406 in order to route to the IBE 405 the service requests for which the backup service should be enabled, DPI 4055 to receive/forward data packets from/to switching matrix 403. Moreover, BCU 4051 uses a Service_Instance Table 407 and a Verification Table 408, respectively shown in FIGS. 5 and 6, as data bases to store the information received by the centralized backup service management unit 106.

Service_Instance Table

Figure 5:
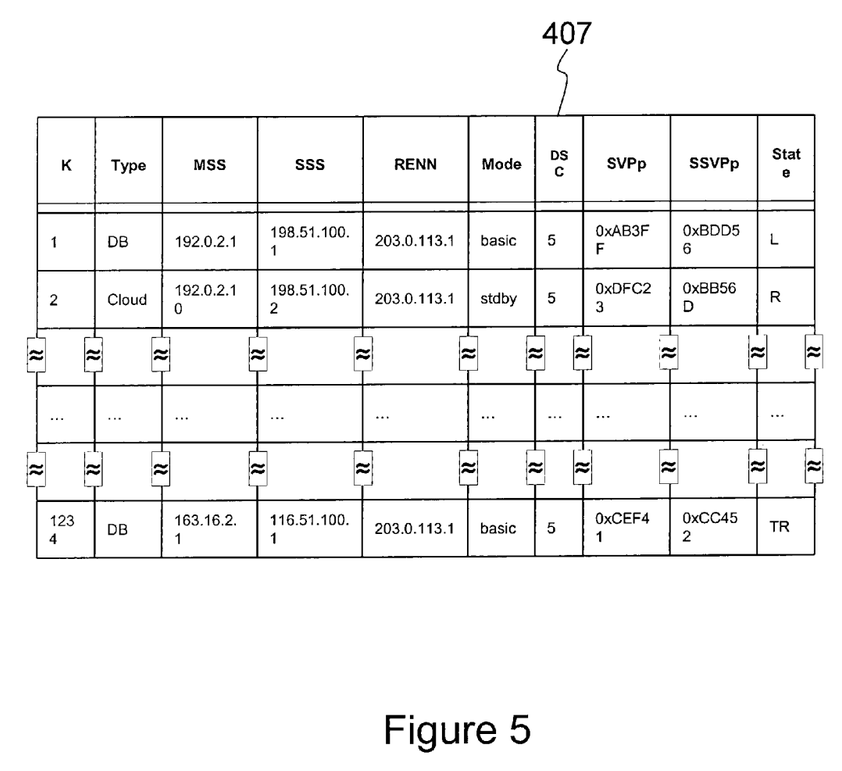
FIG. 5 illustrates a Service_Instance table according to the present invention.

A row is stored in Service_Instance Table 407 for each service request k.

As shown in FIG. 5, each row of the Service_Instance Table 407 includes:

a service request backup identifier, column "k" in FIG. 5, the type of service associated to the service request, column "Type" in FIG. 5, an IP address of the server providing the requested service (Master Service Server), column "MSS" in FIG. 5, one or more addresses of the backup server/s (Slave Service Server/s), column "SSS" in FIG. 5, an address of a remote evolved network node (e.g. the one connected to the current Slave Service Server), column "RENN" in FIG. 5, a backup mode (basic backup or hot standby backup) indicator, column "Mode" in FIG. 5, an initialization value of a counter named state_counter, column "DSC" in FIG. 5, a pointer to a server state verification procedure stored in the SSVU 4053, column "SVPp" in FIG. 5, a pointer to a procedure stored in the SSVU 4053 for checking results of the server state verification procedure, column "SSVPp" in FIG. 5, a state variable, column "State" in FIG. 5.

The state variable may assume the following values:

L, if the requested service is provided in basic backup mode by the server directly connected to the evolved network node 400 (e.g. the Master Service Server 100 if the node is the master node 104);

LE, if the requested service is provided in hot standby backup mode by the server directly connected to the evolved network node 400 (e.g. the Master Service Server 100 if the node is the master node 104);

R, if the requested service is provided in basic backup mode by a server directly connected to a remote evolved network node (e.g. the Slave Service Server 101 if the remote node is the slave node 105);

RE, if the requested service is provided in hot standby backup mode by a server directly connected to a remote evolved network node (e.g. the Slave Service Server 101 if the node is the slave node 105);

TR, if the requested service is currently under transfer from the local evolved network node 400 (e.g. the one connected to the Master Service Server 100) to a remote evolved network node (e.g. the one connected to a Slave Service Server);

TL, if the requested service is currently under transfer from a remote evolved network node to the local evolved network node 400;

TCL, if the operation of transferring the requested service from a remote evolved network node to the local evolved network node 400 is completed.

Verification Table

Figure 6:
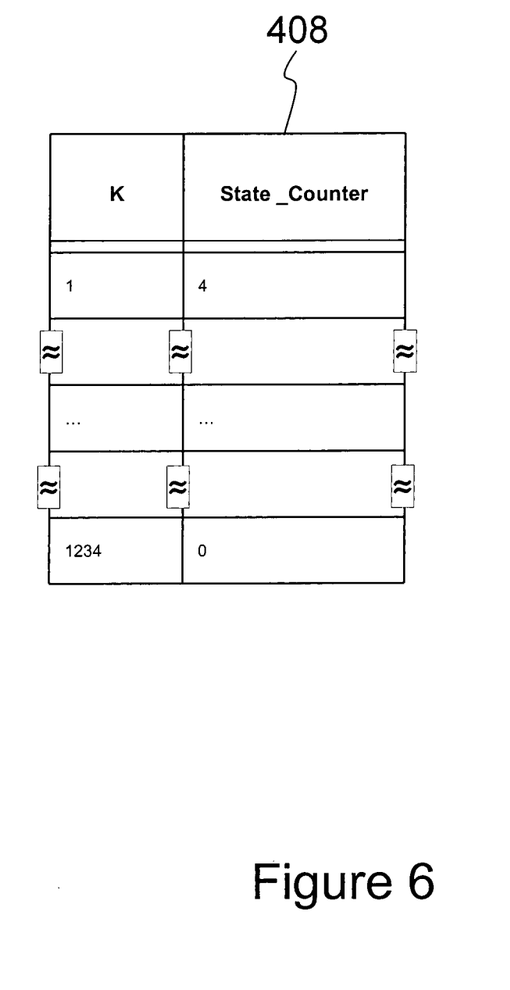
FIG. 6 illustrates a Verification table according to the present invention.

With reference to FIG. 6, the Verification_Table 408 includes a row for each service request k having state L or LE; such row comprises the identifier k of the service request (column "k" in FIG. 6) and a value of the state_counter (column "state_counter" in FIG. 6).

Specifically, the value of the state_counter is representative of the number of times the server state verification procedure detected a failure of the current Service Server, before declaring that the server is not working properly. At every failure detected by the server state verification procedure, the counter counts "1" down, starting from an initial value "Z" (that is the value of the state counter in colums DSC of Service_Instance Table 407, as described in the following). In FIGS. 5 and 6 Z is set, as an example, equal to 5. When the value of the state_counter reaches "0", the backup procedure is enabled.

Base Control Unit

The BCU 4051 comprises two subsystems (not shown in the figures): a centralized backup service management interface and a state handler, which implement the functions hereby described.

Centralized Backup Service Management Interface

The centralized backup service management interface receives from the centralized backup management unit 106 information related to the services for which the backup service according to the present invention should be enabled or disabled.

In case of a new service request k related to one of these services, the above described information is used by the centralized backup service management interface to create and to initialize a new row in the Service_Instance table 407. Further, if the state variable associated to the new service request k is equal to L or LE (this initial state of the state variable depends on the type of service that should be delivered), the centralized backup service management interface sends an Active(k) message to the BSU 4052 and to the CPI 4054 and then it creates a new row in the Verification_Table 408 by initializing the value of the state_ counter to the counter initialization value 'Z' that is reported in the corresponding row of the Service_Instance table 407.

In case of a new service request k with state variable equal to RE, the centralized backup service management interface sends a Cache(k) message to the BSU 4052 that will reserve a buffer unit for caching the packets associated to the new service request k and coming from a remote evolved network node currently acting as a master node.

For a service request k to be removed having state variable equal to L or LE, the centralized backup service management interface sends a Deactive(k) message to BSU 4052 and to the CPI 4054 and then it deletes the corresponding rows in the Service_Instance table 407 and in the Verification_Table 408.

For a service request k to be removed having state variable equal to RE, the centralized backup service management interface sends a Decache(k) message to the BSU 4052 and then it deletes the corresponding row in the Service_Instance table 407.

State Handler

When the state handler receives a Failure(k) message from the SSVU 4053 indicating that the Service Server (Master Service Server) connected to the local evolved network node 400 (master node) is not working properly, it implements the following steps:

sets equal to TR the state variable of the service request k in the Service_Instance table 407, sends to the state handler of the remote evolved network node (namely the node connected to the Slave Service Server currently active) a Modify(k, TL) message for requesting to set equal to TL, in the respective Service_Instance Table, the state variable corresponding to the service request k;

removes the row corresponding to the service request k in the Verification_Table 408.

When the state handler receives an End_of_transfer(k) message from the BSU 4052 for a service request k in basic backup mode, it implements the following steps:

sets equal to R the state variable of the service request k in the Service_Instance table 407, sends to the state handler of the remote evolved network node connected to the Slave Service Server currently active, a Modify(k, TCL) message for requesting to set equal to TCL, in the respective Service_Instance Table, the state variable of the service request k; said Modify (k, TCL) message acts as a trigger signal to the remote evolved network node in order to start the transmission of the data packets related to the service request k to the Slave Service Server (101) (see step 205 of FIG. 2), sends a Deactive(k) message to the BSU 4052 and to the CPI 4054 since from now on the service request k will be managed by the remote evolved network node.

When the state handler receives an End_of_transfer(k) message from the BSU 4052 for a service request k in hot standby backup mode, it implements the following steps:
  sets equal to RE the state variable of the service request k in the Service_Instance table 407,
  sends to the state handler included in the remote evolved network node connected to the currently active Slave Service Server, a Modify(k, TCL) message for requesting to set equal to TCL, in the respective Service_Instance Table, the state variable of the service request k; said Modify(k, TCL) message acts as a trigger signal to the remote evolved network node in order to start the transmission of the stored data packets to the Slave Service Server (101) (see step 208 of FIG. 3),
  sends a Deactive(k) message to the BSU 4052 and to the CPI 4054 and a Cache(k) message to the BSU 4052 so as to reserve a buffer unit for caching the packets that could be received from the remote evolved network node acting as master node.

When the state handler receives a Cache_Empty (k) message from the BSU 4052 indicating that the local evolved network node has no additional cached packets related to the service request k to be transmitted to the local Service Server and therefore the transition of the management of the service request k in basic backup mode from the remote evolved network node to the local evolved network node has been completed, the state handler implements the following steps:
  sets equal to L the state variable of the service request k in the Service_Instance table 407.

When the state handler receives a Cache_Empty(k) message from the BSU 4052 for a service request k in hot standby backup mode, it implements the following steps:
  sets equal to LE the state variable of the service request k in the Service_Instance table 407,
  sends a Decache(k) message to the BSU 4052 because from now on there is no need to cache packets associated to the service request k.

When the state handler receives a Modify(k, TL) message from a remote evolved network node acting as a master node for a service request k in basic backup mode, it implements the following steps:
  sets equal to TL the state variable of the service request k in the Service_Instance table 407,
  sends an Active(k) message to the BSU 4052 and to the CPI 4054.

When the state handler receives a Modify(k, TL) message from a remote evolved network node acting as a master node for a service request k in hot standby backup mode, it implements the following steps:
  sets equal to TL the state variable of the service request k in the Service_Instance table 407,
  sends an Active(k) message to the BSU 4052 and to the CPI 4054 and a Cache(k) message to the BSU 4052.

When the state handler receives a Modify(k, TCL) message from a remote evolved network node for a service request k in basic backup mode or in hot standby backup mode, it implements the following steps:
  sets equal to TCL the state variable of the service request k in the Service_Instance table 407.

Buffer Syncronization Unit

The BSU 4052 comprises an Active Server Buffer Pool, a Cache Server Buffer Pool, an Input Packet Handler and an Output Packet Handler (not shown in the figures), which implement the functions hereby described.

Active Server Buffer Pool

The Active Server Buffer Pool comprises a set of circular buffers; a buffer of this set (Active_Server_Buffer (k)) is associated/dissociated to a service request k upon reception of an Active(k)/Deactive(k) message from the state handler included in the BCU 4051.

Cache Server Buffer Pool

The Cache Server Buffer Pool comprises a set of circular buffers; upon request of the BCU 4051 (via Cache(k)/Decache(k) messages), a buffer of this set (Cache_Server_Buffer (k)) is associated/dissociated to a service request k.

Input Packet Handler

The Input Packet Handler is able to receive input triplet messages (shortened 'input triplets') from the DPI 4055 that in turn it is connected to the Clients I/O Interface 402 and to the Server I/O Interface 401 by means of the Switching Matrix 403. Each input triplet can comprise a packet P, a service request k associated to that packet and an indicator of the origin of the input triplet, said indicator may assume the values service_client or service_ node in order to indicate if a packet is transmitted from a Client 102 or from a Service Server (100 or 101) via the respective evolved network node (104 or 105).

For each triplet (P, k, service_client), originated by a Client and transporting a packet P for a service request k, the Input Packet Handler stores a copy of the packet P into a respective Active_Server_Buffer (k) of the Active Server Buffer Pool.

For each triplet (P, k, service_node), originated by an evolved network node, the Input Packet Handler stores a copy of the packet P into a respective Cache_Server_Buffer (k) of the Cache Server Buffer Pool.

Output Packet Handler

The Output Packet Handler scans the service requests according to a predefined scheduling policy (e.g. a Round Robin scheduling policy) so as to identify packets to be sent over the network. For each service request k, the Output Packet Handler sends one or more output triplet messages (shortened 'output triplets') to the DPI 4055 to be sent to the destination Service Server.

In particular, each output triplet comprises a packet P, the service request k associated to that packet and an indicator of the destination of the packet, this indicator may assume the values service_server or service_node in order to indicate if a packet should be respectively transmitted to the Service Server directly connected to the local evolved network node (in the following called "local Service Server") or to a remote evolved network node.

More specifically, for a service request k having state L, the Output Packet Handler extracts a packet P from the Active_Server_Buffer (k) associated to that service request and then it generates an output triplet (P, k, service_server) and sends it to the DPI 4055. Then, the DPI 4055 sends the packet P to the local Service Server; if the Active_Server_Buffer (k) associated to that service request is empty, i.e. no packet for the service request k is waiting to be forwarded, the Output Packet Handler examines the next service request k+1.

For a service request k having state LE, the Output Packet Handler extracts a packet P from the Active_Server_Buffer (k) associated to that service request and then it generates an output triplet (P, k, service_server) and an output triplet (P, k, service_node) to be sent to the DPI 4055. Then, the DPI 4055 sends the packet P to the local Service Server and a copy of the packet P to a remote evolved network node; if the Active_Server_Buffer (k) associated to that service request is empty, i.e. no packet for the service request k is waiting to be forwarded, the Output Packet Handler examines the next service request k+1. For a service request k having state TL, the Output Packet Handler extracts a packet P from the Cache_Server_Buffer (k) associated to that service request and then it generates an output triplet (P, k, service_server) to be sent to the DPI 4055. Then the DPI 4055 transmits the packet P to the local Service Server; if the Cache_Server_Buffer (k) associated to that service request is empty, i.e. the local evolved network node has no additional cached packet P related to that service request k but it is still waiting for additional packets coming from the remote evolved network node before acting as a maker node, the Output Packet Handler examines the next service request k+1.

For a service request k having state TLC, the Output Packet Handler extracts a packet P from the Cache_Server_Buffer (k) associated to that service request and then it generates an output triplet (P, k, service_server) to be sent to the DPI 4055. Then the DPI 4055 transmits the packet P to the local Service Server; if the Cache_Server_Buffer (k) associated to that service request is empty, i.e. the local evolved network node has no additional cached packets related to the service request k, the Output Packet Handler sends a Cache_Empty(k) message to the BCU 4051 in order to release the Cache_Server_Buffer (k), it updates the state variable of the service request k to the values L or LE, and then it examines the next service request k+1.

For a service request k having state TR, the Output Packet Handler extracts a packet P from the Active_Server_Buffer (k) associated to that service request and it generates an output triplet (P, k, service_ node) to be sent to the remote evolved network node now acting as a master node via the DPI 4055. Then it initializes an Empty_Buffer (k) counter to the value 'Z'. It should be noted that the Empty_Buffer (k) counter acts as a timeout for the procedure of network reconfiguration from a Master Service Server to a Slave Service Server so as to avoid the loss of packets due to the delay occurring because a client carries on sending packets to the Master Service Server even if it does not work properly and the corresponding evolved network node has already started the transfer procedure. Specifically, until the Active_Server_Buffer (k) associated to the service request k to be transferred is not empty, the Output Packet Handler decreases the Empty_Buffer (k) counter at each packet P that is sent. When the counter becomes equal to 0 (zero), namely the Active_Server_Buffer (k) is empty, the Output Packet Handler sends a message End_of_Transfer(k) to the BCU 4051 so as to indicate that no additional operations should be done for the service request k; then it examines the next service request k+1.

For a service request k having state R or RE, there are no packets P to be sent to the DPI 4055. Consequently, the Output Packet Handler examines the next service request k+1.

Data Plane Interface

The DPI 4055 comprises an Input/Output Packet Unit subsystem, a Physical and Data Link Adaptation subsystem, a Data Packet Layer Termination subsystem and a Service Association Unit (not shown in the figures), which implement the functions hereby described.

Input/Output Packet Unit Subsystem

Upon reception of a triplet (P, k, x) from the BSU 4052, the Input/Output Packet Unit subsystem transmits the packet P to the Physical and Data Link Adaptation subsystem if x is set to the value 'service_server', otherwise if x is set to the value 'service_node', the Output/Input Packet Unit subsystem transmits the pair (P, k) to the Data Packet Layer Termination subsystem.

Physical and Data Link Adaptation Subsystem

The Physical and Data Link Adaptation subsystem implements the functions of both a physical layer interface and a data link layer interface toward the switching matrix 403.

The implementation of this subsystem depends on the specific evolved network node technology that is used (e.g. MPLS, IP, Ethernet, etc).

Specifically, when the Physical and Data Link Adaptation subsystem receives a packet P from the switching matrix 403 it routes the packet P, based on its destination address, to the Data Packet Layer Termination subsystem (if the packet P comes from a remote evolved network node) or to the Service Association Unit (if the packet P comes from a client and it is addressed to the local Service Server).

When the Physical and Data Link Adaptation subsystem receives a packet P from the Input/Output Packet Unit subsystem, it routes the packet P to the switching matrix 403.

Data Packet Layer Termination subsystem

The Data Packet Layer Termination subsystem implements functions which are specific of the packet technology used by the network in order to allow communication between the IBE 405 included in the evolved network node acting as a master node and the IBE included in a remote evolved network node acting as a slave node. The Data Packet Layer Termination subsystem also implements functions which allows the communication with the Service Servers and with further systems through the network. As an example, in case of an IP network, the Data Packet Layer Termination subsystem may implement the functions of an IP protocol. Otherwise, the Data Packet Layer Termination subsystem may implement the functions of a tunnelling solution allowing the transport of IP packets encapsulated in other data packets through the packet network (e.g. Generic Routing Encapsulation (GRE), defined by RFC 1701 and 1702, for encapsulating IP inside IP).

More specifically, in case of a packet P coming from the Physical and Data Link Adaptation subsystem (namely from an IBE included in a remote evolved network node, in the following called "remote IBE"), the Data Packet Layer Termination subsystem routes the packet P to the Service Association Unit if the packet P pertains to data traffic. Otherwise, the packet P is routed to the BCU 4051 if it pertains to the management of the service request (e.g. a Modify(k, x) message requiring to be passed to the BCU for updating the state of the service request k in the Service_Instance Table 407).

In case of a pair (P, k) coming from the Input/Output Packet Unit subsystem, the Data Packet Layer Termination subsystem creates a new packet P' to be transmitted to the remote IBE that is identified in the row k of the Service_Instance table 407; as an example, in case of IP protocol with a Generic Routing Encapsulation (GRE), the Data Packet Layer Termination subsystem encapsulates the original packet P in a new IP packet P' having as destination address the IP address of the remote IBE.

In case of a pair (data, k) coming from the SSVU 4053 wherein 'data' is the packet P to be transmitted and k is the associated service request, the Data Packet Layer Termination subsystem creates a new packet P'' to be sent to the local Service Server so as to verify its operative state.

In case of a pair (data, k) coming from the local Service Server in response to a verification of its operative state, wherein 'data' is one of the packets P sent by the local Service Server in response to the server state verification procedure and k is the associated service request, the Data Packet Layer Termination subsystem routes the pair (data, k) to the SSVU 4053.

Service Association Unit

Upon reception of a packet P from the Physical and Data Link Adaptation subsystem or from the Data Packet Layer Termination subsystem, the Service Association Unit searches in the Service_Instance table 407 for identifying the service request k to which the packet P is associated.

Then, the Service Association Unit transmits a triplet (P, k, x) to the BSU 4052; wherein x is set to the value 'service_client' in case the packet P is received from a client, or x is set to the value 'service node' in case the packet P is received from a remote IBE.

Service State Verification Unit

The SSVU 4053 periodically or for each service request k to be checked monitors the operative state of the local Service Server connected to the evolved network node 400. In particular the SSVU 4053 scans the Verification_Table 408 in order to find in this table the row corresponding to service requests k and the Service_Instance table 407 to identify in the column "SVPp" of the row k whose server state verification procedure the SSVU 4053 should apply; as an example, the server state verification procedure to be applied may operate by transmitting a sequence of packets P to the local Service Server and by waiting for an expected reply. Particularly, in an IP network the packets P may be ICMP (Internet Control Message Protocol) packets that are used to check the operative state of a particular TCP/UDP port used by the Service Server to communicate with the clients.

The SSVU 4053 includes a Verification Request Handler and an Input Result check unit (not shown in the figures), which implement the functions hereby described.

Upon reception of the pair (data, k) from the DPI 4055, the Verification Request Handler scans the Verification_Table 408 by using an appropriate scheduling policy (e.g. Round Robin) so as to identify the row k of the Verification_Table 408 corresponding to the service request k. If the value of the state_counter in the row k of the Verification_Table 408 is equal to 0 (zero), the Verification Request Handler transmits a Failure(k) message to the BCU 4051 so as to indicate that the local Service Server is not working properly for delivering the service associated to that service request k. Otherwise, if the value of the state_counter in the row k is not equal to 0 (zero), the Verification Request Handler starts the corresponding server state verification procedure by, for example, generating a sequence of packets to be sent to the local Service Server so as to verify its state (e.g. the ICMP packets described above). The results of the server state verification procedure are sent to the Input Result check unit that scans the Service_Instance table 407 to identify in the column "SSVPp" of the row k whose result check procedure should be applied. Afterwards, the Input Result check unit executes the identified result check procedure. If the result check procedure gives a positive result, (e.g. a prompt reply has been received by the local Service Server to the transmitted sequence of packets), it increases the value of the state_counter in the row k of the Verification_Table 408, otherwise (e.g. if no reply has been received from the local Service Server to the transmitted sequence of packets) the Input Result check unit transmits a negative result to the Verification Request Handler that decreases the value of the state_counter in the row k and then restarts the server state verification procedure. This way of operation goes on until the value of the state_counter in the row k becomes equal to 0. At this point, the Verification Request Handler declares that the local Server is not working properly for that specific service by transmitting the Failure(k) message to the BCU 4051.

Otherwise, if the server state verification procedure does not detect any failure, the Verification Request Handler sends the pair (data, k) to the DPI 4055 that will send the packet P/data to the local Service Server.

Control Plane Interface

CPI 4054 is the interface toward the Control Plane 404 of the considered evolved network node 400. This interface is configured to modify the packet routing rules defined by the Control Plane 404 in such a way that packets P related to a service request k associated to a service to be checked are sent to the local IBE before being routed to the Server I/O Interface 401.

CPI 4054 can be implemented in different ways depending on the specific network node technology.

Specifically, when an Active(k) message is received from the BCU 4051, the CPI 4054 extracts from the row k of the Service_Instance table 407 the address of the Service Server that is in charge of managing the service request k and whose traffic shall be intercepted. CPI 4054 then sends to the Control Plane 404 instructions to add in the forwarding table 406 a forwarding rule so that any packet of the service request k intended for the extracted address shall be forwarded to the local IBE.

In the same way, upon reception of a Deactive (k) message from the BCU 4051, CPI 4054 requests the Control Plane 404 to delete from the forwarding table 406 the forwarding rule associated to the service to be checked.

From the above description, the features and the advantages of the invention are clear; in the same way it is also clear how the system and method above achieves the objects listed above.

Moreover, a person skilled in the art may implement (without departing from the scope of the invention as defined by the present description and claims) several modification to the method and system above described with reference to the non-limitative examples of FIGS. 1 to 6.

As an example, the Master Service Server and/or the Slave Service Server may be replaced by a plurality of devices connected, integrated or in any way cooperating or put into communication between them.

The invention claimed is:

1. A method providing service continuity in a telecommunication network, wherein a first network device of the network receives a service request sent by a client computer to a first service server providing the service, the first service server accessing the network by the first network device, the method comprising:
   storing a copy of data packets related to the received service request;
   starting a server state verification procedure to check an operative state of the first service server; and
   transmitting the data packets to a second service server if the server state verification procedure detects a failure in the operative state of the first service server, the second service server being configured to act as a backup server for the service to be provided;
   wherein the storing the data packets comprises:
      transmitting the data packets by the first network device to a second network device of the network, the second service server accessing the network by the second network device; and
      storing at the second network device a copy of the data packets; and wherein the transmitting the data packets comprises:
sending a trigger signal by the first network device to the second network device if the server state verification procedure detects a failure in the operative state of the first service server; and
transmitting the stored data packets by the second network device to the second service server after receiving the trigger signal.

2. The method according to claim 1, further comprising transmitting the data packets by the first network device to the first service server if the server state verification procedure detects no failure in the operative state of the first service server.

3. The method according to claim 1, wherein the first network device periodically starts the server state verification procedure.

4. The method according to claim 1, wherein the first network device starts the server state verification procedure for each received service request.

5. A non-transitory computer readable medium including a computer program comprising computer program code means adapted to perform the method of claim 1, when the program is run on one or more computers.

6. A system providing service continuity in a telecommunication network including a first network device configured to receive a service request sent by a client computer to a first service server providing the service, the first service server accessing the network by the first network device, the system comprising configured to:
at the first network device,
first processing circuitry configured to
store, at a first memory, a copy of data packets related to the received service request,
start a server state verification procedure to check an operative state of the first service server,
transmit the data packets to a second service server if the server state verification procedure detects a failure in the operative state of the first service server, the second service server being configured to act as a backup server for the service to be provided, and
transmit the data packets by the first network device to a second network device of the network, the second service server accessing the network by the second network device; and
at the second network device,
second processing circuitry configured to store, at a second memory, a copy of the data packets,
wherein the first network device is configured to send a trigger signal to the second network device if the server state verification procedure detects a failure in the operative state of the first service server, and
the second network device is configured to transmit the stored data packets to the second service server after receiving the trigger signal.

7. A network device of a telecommunication network comprising:
processing circuitry configured to implement
a receiving unit configured to receive a service request sent by a client computer to a first service server providing the service, the first service server accessing the network by the network device;
a buffering unit configured to store a copy of data packets related to the received service request;
a verification unit configured to start a server state verification procedure to check an operative state of the first service server; and
a transmitting unit configured to transmit the data packets to a second service server if the server state verification procedure detects a failure in the operative state of the first service server, the second service server configured to act as a backup server for the service to be provided,
wherein the transmitting unit is further configured to transmit the data packets to a second network device of the network, the second service server accessing the network by the second network device, and to send a trigger signal by the first network device to the second network device if the server state verification procedure detects a failure in the operative state of the first service server.

8. The network device according to claim 7,
the processing circuitry being further configured to:
detect reception of the data packets to drive the receiving unit to route the data packets to the buffering unit;
address the buffering unit for storing a copy of the data packets and address the verification unit for starting the server state verification procedure to check the operative state of the first service server;
drive the transmitting unit to transmit the stored data packets to the second service server if the server state verification procedure detects a failure in the operative state of the first service server.

* * * * *